United States Patent Office 2,782,217
Patented Feb. 19, 1957

2,782,217
ISONONYLPHENYL-n-OCTANE SULFONATE

Joachim Dazzi, Dayton, Ohio, assignor to Monsanto Chemical Company, St. Louis, Mo., a corporation of Delaware No Drawing. Application January 7, 1953,
Serial No. 330,159

1 Claim. (Cl. 260—456)

This invention relates to new aromatic-aliphatic sulfonates and to vinyl chloride polymers plasticized with the new sulfonates.

A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition, such as low volatility, color and heat stability, water absorption, etc.

Among compounds which have been found to be good plasticizers for vinyl chloride polymers are aryl esters of certain long-chained paraffin sulfonic acids, e. g., the phenyl esters of alkanesulfonic acids in which the alkane chain has from 10 to 14 carbon atoms, as described in the copending application of Earl W. Gluesenkamp and Joachim Dazzi, Serial No. 111,562, filed August 20, 1949, now U. S. Patent No. 2,610,164, and phenyl esters of alkanesulfonic acids in which the alkane chain has from 19 to 21 carbon atoms, as described in the copending application of Earl W. Gluesenkamp and Joachim Dazzi, Serial No. 111,563, filed August 20, 1949, now U. S. Patent No. 2,610,165. It was found that aromatic esters of alkane sulfonic acids having fewer than 10 carbon atoms in the hydrocarbon chain were too volatile for use as general purpose plasticizers, the heat-stability of the plasticized product decreasing with decreasing chain-length.

Now I have found that very good low-temperature flexibility without sacrifice of heat stability is conferred to vinyl chloride polymers when there is employed as plasticizer the hitherto unknown alkylphenyl alkanesulfonates of the formula

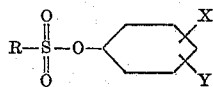

in which R is an alkyl radical of from 6 to 9 carbon atoms, X is selected from the class consisting of hydrogen and alkyl radicals of from 4 to 6 carbon atoms and Y is an alkyl radical of from 4 to 12 carbon atoms, and in which the total number of carbon atoms in the sum of X plus Y is from 8 to 12. Examples of sulfonates having the above general formula and especially valuable as plasticizers for polyvinyl chloride are 2-, 3- or 4-nonylphenyl n-octanesulfonate and 2-, 3- or 4-isononylphenyl n-octanesulfonate, the nonylphenyl n-hexanesulfonates, the nonylphenyl n-heptanesulfonates, the decylphenyl n-octanesulfonates, the decylphenyl n-heptanesulfonates, the decylphenyl n-nonanesulfonates, the octylphenyl n-hexanesulfonates, the octylphenyl n-heptanesulfonates, the octylphenyl n-octanesulfonates, the undecylphenyl n-octanesulfonates, the undecylphenyl n-nonanesulfonates, the dodecylphenyl n-hexanesulfonates, the dodecylphenyl n-octanesulfonates, the dibutylphenyl n-octanesulfonates, the diisobutylphenyl n-octanesulfonates, the di-n-amylphenyl n-heptanesulfonates, the dihexylphenyl n-hexanesulfonates, the dihexylphenyl n-octanesulfonates, the di-tert-amylphenyl n-nonanesulfonates, the (amyl)(butyl)phenyl n-octanesulfonates, the (butyl)-(hexyl)phenyl n-heptanesulfonates, etc.

Compounds having the above general formula are readily prepared by reaction of the appropriate alkyl-substituted phenol with the appropriate alkanesulfonyl halide, e. g., a n-octanesulfonyl chloride, n-hexanesulfonyl chloride, n-heptanesulfonyl bromide or n-nonanesulfonyl bromide, advantageously in the presence of a basic agent, e. g., an inorganic alkali hydroxide or carbonate such as potassium hydroxide or sodium carbonate, ammonia or ammonium hydroxide, an organic base such as pyridine, etc. Reaction may be effected in aqueous or inert organic liquid media. Since the condensation is exothermic, no extraneous heating is necessary; however, moderate heating has an accelerating effect.

Phenols useful for the present purpose have the formula

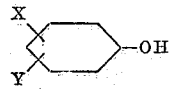

in which X is selected from the class consisting of hydrogen and alkyl radicals of from 4 to 6 carbon atoms and Y is an alkyl radical of from 4 to 12 carbon atoms and in which the total number of carbon atoms in Y plus X is from 8 to 12. Examples of useful phenols include di-n-hexylphenol, dodecylphenol, isooctylphenol, di-n-butylphenol, n-decylphenol, etc.

The n-alkanesulfonyl halide employed may be obtained e. g., by sulfochlorination of a normal alkane, e. g., n-octane or n-heptane, in which case the n-alkanesulfonyl halide is a mixture of straight-chain alkanes having a sulfonyl chloride radical substituted randomly along the carbon chain. The use of the n-octanesulfonyl halides for the preparation of the present plasticizers is of particular economic advantage in that n-octane is a by-product in the manufacture of isooctane fuel. The alkanesulfonyl halide employed may also be a n-alkane-1-sulfonyl halide which is obtainable, e. g., by reaction of an n-alkane-1-sulfonic acid with thionyl chloride, thionyl bromide or phosphorus pentachloride, e. g., n-hexane-1-sulfonyl chloride or n-nonane-1-sulfonyl bromide.

The present sulfonates are valuable plasticizers for polyvinyl chloride and copolymers of at least 70 percent by weight of vinyl chloride and up to 30 percent by weight of an unsaturated monomer copolymerized therewith, for example vinyl acetate, vinylidene chloride, etc. The sulfonates not only soften vinyl chloride polymers, but also impart simultaneously to these polymers a high degree of low temperature flexibility, very good temperature stability and great mechanical strength. The present alkylphenyl n-alkanesulfonates give continuous, homogeneous compositions with vinyl chloride polymers and show no exudation of plasticizer even at a plasticizer content of up to 50 percent. Although the quantity of plasticizer will depend upon the particular polymer to be plasticized and upon its molecular weight, it is generally found that compositions having from 5 percent to 50 percent by weight of plasticizer will, in most cases be satisfactory for general utility. The good flexibility of the plasticized compositions increases with increasing plasticizer concentration.

In evaluating plasticizer efficiency, use is made of the empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument and Manufacturing Company is used for this determination and expresses the hardness in units from one to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibiilty tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is the carbon absorption method of the Society of the Plastics Industry.

*Water resistance.*—The amount of water absorption and the amount of leaching that takes place when the plasticized composition is immersed in distilled water for twenty-four hours is determined.

The invention is further illustrated, but not limited, by the following examples:

EXAMPLE 1

*Preparation of 4-isononylphenyl n-octanesulfonate*

To a mixture consisting of 0.18 mole NaOH as 16 percent aqueous solution and 30.8 g. (0.14 mole) of 4-isononylphenol in 50 ml. of dioxane there was added, while stirring, during 25 minutes and at a temperature of from 50° C. to 60° C., 29.8 g. (0.14 mole) of n-octanesulfonyl chloride. The resulting mixture was stirred for 3 more hours at 55°–70° C. and then for an additional 16 hours at room temperature. The reaction mixture was then washed neutral, the dioxane was distilled off and the residue was vacuum fractionated to give a fraction, B. P. 200° C.–220° C./1-2 mm., a light yellow liquid, comprising substantially pure 4-isononylphenyl n-octanesulfonate, $n_D^{25}$ 1.4955.

Forty parts by weight of the 4-isononylphenyl n-octanesulfonate and sixty parts by weight of polyvinyl chloride were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above gave a value of minus 23° C., which value denotes extremely good low temperature properties. Tests on the volatility characteristics of the plasticized composition gave a value of only 6.6 percent. When subjected to heat at a temperature of 325° F. for a period of 30 minutes, the clarity and color of the molded product was substantially unchanged. Tests of the water-resistance properties of the plasticized material employing the test procedure described above showed a solids-loss of only 0.04 percent and an 0.23 percent water-absorption value.

EXAMPLE 2

To a charge consisting of 105 g. (0.45 mole) of di-sec-amylphenol and a solution of 20 g. of sodium hydroxide in 30 ml. of water there was gradually added, during 2.5 hours, 0.4 mole of n-heptanesulfonyl chloride. An exothermic reaction occurred. In order to neutralize any excess acid, 0.06 mole of sodium hydroxide was then added to the reaction mixture, and the whole was stirred for one hour at 60–65° C. The mixture was subsequently cooled, stirred overnight, diluted with ether, made neutral, and vacuum distilled to give the substantially pure, yellow di-sec-amylphenyl n-heptanesulfonate, B. P. 181°–215° C./ 1.0 mm., $n_D^{25}$ 1.4930, analyzing 8.04 percent S, as against 8.07 percent S, the calculated value for this ester.

Sixty parts of polyvinyl chloride and forty parts by weight of the di-sec-amylphenyl n-heptanesulfonate were mixed on a rolling mill to a homogenous blend. During the milling there was observed substantially no fumes and discoloration. A molded sheet of the mixture was clear, transparent and substantially colorless. Testing of the molded sheet for low temperature flexibility according to the testing procedure described above gave a low temperature flexibility value of minus 24° C. Tests on the volatility characteristics of the plasticized composition gave a volatility value of 8.04 percent. When subjected to a heat of 325° F. for a peroid of 30 minutes the clarity and color of the molded product were substantially unchanged. Tests of the water-resistance properties showed a solids-loss value of 0.18 percent and a water-absorption value of 0.42 percent.

EXAMPLE 3

Operating substantially as in Example 1, but using n-heptanesulfonyl chloride instead of n-octanesulfonyl chloride, 4-isononylphenyl n-heptanesulfonate was prepared. Evaluation of this ester by the methods used in Example 1 gave a low temperature flexibility value of minus 16.5° C., a volatility value of 5.5 percent, a solids-loss value of 0.02 percent and a water-absorption value of 0.29 percent.

EXAMPLE 4

For purposes of comparison phenyl n-octanesulfonate and diisononylphenyl n-heptanesulfonate were prepared and evaluated for plasticizer efficiency by the testing methods used in Example 1. While the low temperature flexibility value of the polyvinyl chloride which had been plasticized with the phenyl n-octanesulfonate was highly satisfactory, the volatility value of the plasticized composition was found to be 64.3 percent. Phenyl n-octanesulfonate thus possesses no value as a polyvinyl chloride plasticizer. The diisononylphenyl n-heptanesulfonate was found to be very incompatible with polyvinyl chloride and films could not be formed from mixtures of this halide and the polymer.

Instead of the 4-isononylphenyl n-octanesulfonate or n-heptanesulfonate or the diisoamyl n-heptanesulfonate, the other isomeric isononylphenyl n-octanesulfonates or other mono- or dialkylphenyl alkanesulfonates in which the total number of carbon atoms in the alkyl or alkyl radicals is from 8 to 12 and the number of carbon radicals in the alkane chain is from 6 to 9 may be similarly prepared and employed with polyvinyl chloride to yield valuable plasticized compositions. Thus, by employing 40 parts by weight of 2-isononylphenyl n-nonanesulfonate or of dihexylphenyl n-hexanesulfonate with 60 parts by weight of polyvinyl chloride or with 60 parts by weight of a vinyl chloride-vinyl acetate copolymer known to the trade as "Vinylite," there are obtained clear, colorless compositions of very good flexibility and stability.

While the above examples show only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only ten per cent to twenty per cent is preferred. The present esters are compatible with polyvinyl chloride over a wide range of concentrations, up to 50 percent of esters based on the total weight of the plasticized composition yielding desirable products.

Although the invention has been described particularly with reference to the use of the present alkylphenyl alkanesulfonates as plasticizers for polyvinyl chloride, these esters are advantageously employed also as plasticizers for copolymers of vinyl chloride, for example, the copolymers of vinyl chloride with vinyl acetate, vinylidene chloride, methyl methacrylate, etc.

Preferably, such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized materials does not impair the valuable properties of the present esters. The present esters are of general utility in softening vinyl chloride polymers. They may be used as the only plasticizing component in a compounded vinyl chloride polymer or they may be used in conjunction with other plasticizers.

This application is a continuation-in-part of my application Serial No. 207,859, filed January 25, 1951, and now abandoned.

What I claim is:

Isononylphenyl n-octanesulfonate.

References Cited in the file of this patent

UNITED STATES PATENTS

| 2,486,417 | Jackson | Nov. 1, 1949 |
| 2,610,164 | Gluesenkamp et al. | Sept. 9, 1952 |
| 2,610,165 | Gluesenkamp et al. | Sept. 9, 1952 |
| 2,684,955 | Knowles et al. | July 27, 1954 |

OTHER REFERENCES

Modern Plastics, vol. 24, No. 7, March 1947, pages 154–156.